United States Patent [19]

Kohlmüller

[11] 3,960,598

[45] June 1, 1976

[54] FILTER PRESS-TYPE FUEL CELL BATTERY

[75] Inventor: Hans Kohlmüller, Erlangen, Germany

[73] Assignee: Siemens Aktiengesellschaft, Munich, Germany

[22] Filed: Mar. 21, 1974

[21] Appl. No.: 453,396

[30] Foreign Application Priority Data

Mar. 30, 1973 Germany............................ 2316067

[52] U.S. Cl............................................... 136/86 R
[51] Int. Cl.²........................................... H01M 8/02
[58] Field of Search................................... 136/86 R

[56] References Cited
UNITED STATES PATENTS

| | | | |
|---|---|---|---|
| 3,515,593 | 6/1970 | Nickols | 136/86 R |
| 3,533,852 | 10/1970 | Baker et al. | 136/86 R |
| 3,783,107 | 1/1974 | Kohlmüller | 136/86 R |

Primary Examiner—John H. Mack
Assistant Examiner—H. A. Feeley
Attorney, Agent, or Firm—Kenyon & Kenyon Reilly Carr & Chapin

[57] ABSTRACT

A fuel cell battery of the filter press-type which uses a liquid electrolyte and at least one gaseous reactant, with the individual fuel cells which make up the battery having gas and electrolyte chambers separated from each other by asbestos diaphragms with the asbestos diaphragms having electrolyte-impermeable, gas-tight outer zones of increased thickness which are pressed together or against separator sheets and contain supply ducts formed therein, in which the width of the outer zone of increased thickness on the electrolyte side is made smaller than the width of the same part on the gas side and where the means such as a support frame or electrode causing separation in the electrolyte chamber are sized to extend beyond the inner edge of the outer zone on the gas side.

7 Claims, 10 Drawing Figures

FILTER PRESS-TYPE FUEL CELL BATTERY

BACKGROUND OF THE INVENTION

This invention relates to fuel cell batteries of the filter press-type design in general, and more particularly to an improved construction for such battery. Fuel cells using a liquid electrolyte and at least one gaseous reactant with the electrolyte and gas chambers of each of the individual fuel cells separated from each other by asbestos diaphragms and the individual fuel cells separated from each other by separator sheets, have been developed. Examples of such fuel cells are disclosed in German Offenlegungsschrift No. 2,026,220. As disclosed therein, the asbestos diaphragms have an electrolyte-impermeable and gastight outer zone of increased thickness. The outer zone of increased thickness forms a peripheral area which defines chambers for the gas or electrolyte when the asbestos diaphragms are pressed together directly or against the separator sheets separating the individual cells. Supply ducts for the electrolyte and the gas or gases to circulate them through the chambers are formed in the reinforced outer zones. As more fully disclosed in the above referenced Offenlegungsschrift, this design avoids the disadvantages associated with the plastic frames previously used in fuel cell batteries of this type and in particular, makes unnecessary the use of additional sealing elements such as sealing rings and the previously required plastic frames, thereby permitting a fuel cell which is thinner and of a much simpler design.

Within the electrolyte and gas chambers defined by the reinforced peripheral outer zones of the asbestos diaphragms, the asbestos diaphragms themselves and the separator sheets, electrodes and support frames are inserted when the battery is assembled.

One type of a fuel cell battery previously disclosed has fuel cells with a liquid electrolyte for reacting gaseous reactants such as hydrogen and oxygen. In this type of fuel cell, an electrode in powder form is placed in each of the gas chambers. That is, in this construction, two gas chambers are provided, one on each side of an electrolyte chamber. The electrolyte chamber has a support frame situated therein which maintains proper spacing of the two asbestos diaphragms forming the sides of the chamber. These two asbestos diaphragms, respectively, form one side of each of the gas chambers with the other side of the gas chamber defined by a separator plate. The electrode in powder form in each of the gas chambers is pressed toward the support frame by metal screens with the pressure transmitted through the asbestos diaphragms.

Another embodiment of a fuel cell battery has fuel cells in which a fuel such as hydrazine is dissolved in an electrolyte and is reacted with a gaseous oxidant such as oxygen. In fuel cells of this nature, a fuel electrode (anode) for example, in the form of a screen electrode, and a support frame are arranged in the electrolyte chamber. In this arrangement, each cell includes only one gas chamber associated with the electrolyte chamber. The gas chamber is separated from the electrolyte chamber by an asbestos diaphragm with an oxidant electrode (cathode) such as an oxygen gas diffusion electrode placed in the gas chamber on the other side of the asbestos diaphragm. Thus, the asbestos diaphram forms one side of the electrolyte chamber and one side of the gas chamber. The other sides of the respective chambers are formed by separator sheets which are in electrically conducting contact with adjacent electrodes.

It has been discovered that in the manufacture of the individual parts of batteries of this nature, i.e., the manufacture of parts such as asbestos diaphragms, electrodes and support frames, only certain manufacturing tolerances can be obtained in a practical manner. This is particularly true when constructing the fuel cell batteries of large output ratings in the range of several kilowatts and which require several hundred fuel cells in a single battery. Because of the large number of individual parts required in such a battery, for economic reasons, it is necessary that tolerances not be too close. Otherwise, the cost of manufacturing would be too great.

In fuel cell batteries of this nature, the pressure in the gas chambers is generally higher than the pressure in the electrolyte chambers. For example in a hydrazine/oxygen battery, the pressure in the electrolyte chamber will be about 15 $N/cm^2$ and in the gas chamber, which is separated from the electrolyte chamber by an electrolyte-saturated, gastight asbestos diaphragm, about 20 $N/cm^2$. The pressure difference between the pressure in the gas chamber and in the electrolyte chamber is counter-acted by the contact pressure of the approximately equal electrodes and/or support frames. Thus, the asbestos diaphragm will be stressed only in compression, and there will be no shear forces on the area of the asbestos diaphragm between two adjacent components. This can be seen by reference to FIG. 10 in which an asbestos diaphragm 100 separting a hydrazine electrode 104 in an electrolyte chamber and an oxygen electrode 105 in a gas chamber. Over the distance designated L, the asbestos diaphragm 100 is supported on both sides by the respective adjacent components. In the prior art, the support frames and electrodes were made of approximately the same size. Thus, in the prior art, the hydrazine electrode 104 would have been terminated at the line 120. In such a case, the enlarged reinforced outer zone of the diaphragm would have been equal on both sides as shown by the dotted lines. Because of the above noted manufacturing tolerances, a gap G remains between the electrode and the edge such as edge 108 of the reinforced outer portion of the diaphragm. Gaps in the range of 0.1 to 3 mm will be found in typical fuel cells. In this gap area G, there is a pressure towards the electrolyte chamber in the direction of arrow 121 due to the higher gas pressure. As a result, shear forces develop which are a function of the gap width and the prevailing pressure difference. These forces acting for an extended period of time can lead to damage of the asbestos diaphragm, particularly to tearing of the diaphragm in the vicinity of the gaps. Thus, it can be seen that there is a need to eliminate these problems by providing an improved design in which such shear forces are not present.

SUMMARY OF THE INVENTION

In view of the above noted problems, it is the object of the present invention to eliminate the difficulties which arise from the use of components in a fuel cell battery of the type described above, which components are not of a particularly high tolerance. In particular, it is desired that the shear forces which result in damage to the asbestos diaphragm over periods of extended operations be prevented.

The present invention achieves this object by making the width of the portion of the outer zone of the asbestos diaphgram which is on the electrolyte side of the central part of the diaphragm smaller than the width of the part of the outer zone situated on the gas side and by extending the support frame or electrodes placed in the electrolyte chamber to extend beyond the inner edge of the part of the outer zone on the gas side. The central part of the outer zone also referred to as the middle part of the outer zone is the portion of the asbestos diaphragm which continues over the full area and which in the central portion separates the electrolyte chamber and the gas chamber.

To insure reliable operation within all ranges of manufacturing tolerances, it is preferable that the support frames or electrodes in the electrolyte chamber extend beyond the inner edge of the part of the outer zone on the gas side by at least an amount which corresponds to its distance from the part of the outer zone on the electrolyte side. With the gap width being as defined above, i.e., the distance between a component and the part of the reinforced outer zone of the asbestos diaphragm which seals the chamber in which the component is located, the components in the electrolyte chamber should be chosen to be larger by at least twice the gap width than the components in the gas chamber. In general, with gap widths between 0.1 and 3 mm, support frames or electrodes in the electrolyte chamber can be sized so that they extend at least 4 mm beyond the edge on all sides when referred to the electrodes arranged in the gas chamber.

In one illustrated embodiment, for a fuel cell battery which reacts a fuel dissolved in a liquid electrolyte with a gaseous oxidant, the fuel electrode (anode) in the electrolyte chamber has a larger area than the adjacent oxidant electrolyte (cathode) which is in the adjoining gas chamber and separated therefrom by an asbestos diaphragm. The support frame associated with the fuel electrode in the electrolyte chamber has the same area dimension as the fuel electrode. Thus, in the illustrated embodiment of a hydrazine/oxygen fuel cell battery, the hydrazine electrodes and their corresponding support frames are larger than the oxygen electrodes.

In another embodiment illustrating a fuel cell battery in which a gaseous fuel is reacted with a gaseous oxidant, the support frame placed in the electrolyte chamber has a larger area than the electrodes for the fuel (anode) or the oxidant (cathode) which are placed in gas chambers on each side of the electrolyte chamber with each of the gas chambers separated from the support frame by a respective asbestos diaphragm. In the gas chambers, there are also illustrated metal screens with the same area dimensions as electrodes for providing support to the electrodes. In the illustrated embodiment, a hydrogen oxygen fuel cell battery has a support frame in the electrolyte chamber larger than the hydrogen and oxygen or air electrodes.

As more fully described in the above referenced Offenlungsschrift, the asbestos diaphragms with the reinforced outer-zones can be made in one piece using appropriate molds and can be made electrolyte-impermeable and gas-tight in the outer zones by impregnating a suitable resistance synthetic material.

A particularly advantageous method of building up the outer zone of the asbestos diaphragms from three layers is disclosed herein. In this arrangement, the middle layer is a continuation of the central part of the asbestos diaphragm separating the chambers. The outer zone of this middle area is impregnated with an electrolyte resistance multi-component synthetic resin after which the two outer layers to form with the middle layer the reinforced outer zone, are cemented to the middle layer. These outer layers have supply ducts formed therein, prior to cementing. These outer layers are filled with a softer electrolyte resistance synethetic material.

With a design such as this, the individual parts making up the asbestos diaphragm can first be fabricated separately thereby making the formation of the supply ducts simplier. The use of the multi-component resin makes the outer zone of the middle layer electrolyte -impervious and gas-tight. At the same time, this multi-component synthetic resin also is used for cementing the middle layer to the two outer layers. Through the curing of the multi-component synthetic resin after cementing, an excellent, tight cement bond with the two outer layers is obtained. At the same time, the middle layer is strengthened so that it cannot be pushed into the supply ducts, which are provided in the two outer layers, when the individual parts are pressed together. Since the outer layers are filled with a softer synthetic material they can be formed somewhat under compression, thereby further enhancing the sealing effect.

In the disclosed embodiment, epoxy resins are disclosed as being particularly well suited as the synthetic multi-component resins. For use as the softer electrolyte-resistant synthetic materials for the outer layers, polytetrafluorethylene or polyvinylchloride are disclosed.

Through the use of a three layer outer zone, the fabrication of outer zones of different width to form the two different size chambers on each side of the asbestos diaphragm is also simplified. Through this method, outer layers of the proper size for each side of the asbestos diaphragm can be pre formed and then need only be cemented to the middle portion. As noted above, the width of the outer zone on the electrolyte side of the central part is made smaller than the width of the layer situated on the gas side. This forms the two spaces of different sizes on opposite sides of the asbestos diaphragm with the space having a larger cross-sectional area being used as an electrolyte chamber and the space of smaller size as a gas chamber in the finished battery. This arrangement along with the above noted sizing of the electrodes and support plates result in an elemination of the shear forces and the destruction of the asbestos diaphragm associated therewith.

DETAILED DESCRIPTION OF THE PREFERRED EMBODIMENT

Figure 1:
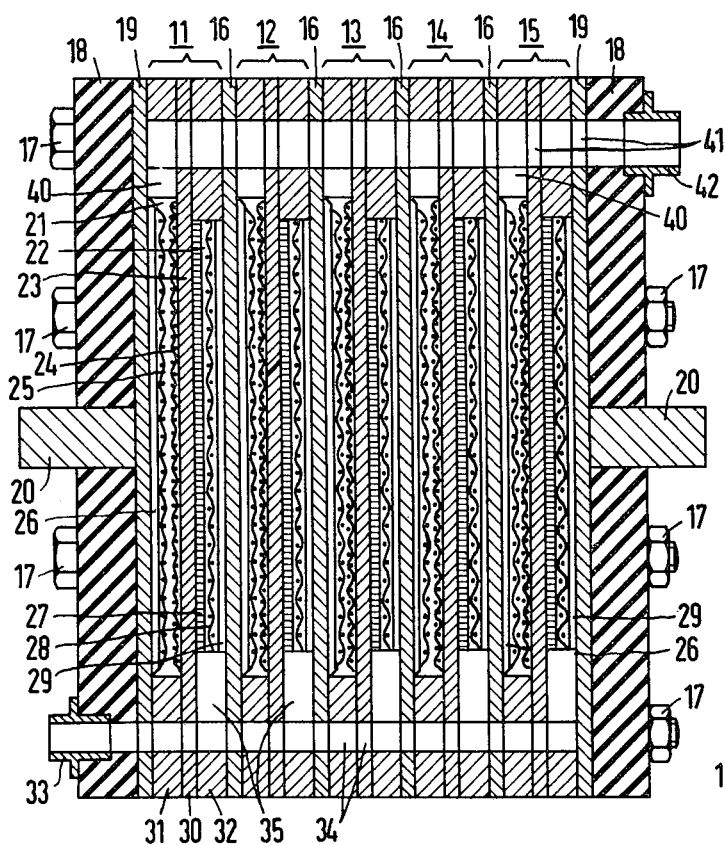
FIG. 1 is a schematic cross sectional view of a first embodiment of a fuel cell battery according to the present invention.

FIG. 1 illustrates a fuel cell battery in which a liquid fuel dissolved in an electrolyte is reacted with a gaseous oxidant. Typically, the fuel may be hydrazine which is dissolved in an electrolyte of 6 n potassium hydroxide solution. The gaseous oxidant may be, for example, oxygen. The fuel cell battery illustrated on FIG. 1 includes five fuel cells numbered 11 through 15, separated from each other by separator sheets 16 consisting of nickel. The fuel cells 11 through 15 and the associated separator sheets 16 between individual fuel cells are arranged to form a stack and are clamped together using bolts 17 between end plates 18. End plates 18 may consist of Plexiglas or fiber-reinforced epoxy resin, for example. Between the end plates 18 and the fuel cells 11 and 15 respectively, a further nickel sheet 19 is provided at each end to serve as a contact sheet. Each of the contact sheets 19 has connected at its center a terminal 20, which is brought to the outside through appropriate holes in the end plates 18. Each individual fuel cell comprises an electrolyte chamber 21 and a gas chamber 22 separated from each other by an asbestos diaphragm 23.

In the electrolyte chamber 21, an anode 24 serving as the hydrazine electrode is placed adjacent to the diaphragm 23. Anode 24 will comprise, for example, a fine-mesh nickel screen having a wire diameter of about 0.13 mm which is coated with 1 mg of platinum per $cm^2$ as a catalyst. Adjacent to the anode 24 is a coarse-mesh metal screen 25 which may be of nickel and which serves as the support frame or spacer and as the current pick-up contact for the anode 24. It will be recognized that other catalytic materials instead of platinum can be provided. For example, the nickel screen can also be coated with Raney nickel. The metal screen 25 is in contact with rib-like or corrugated waves 26 on the contact sheet 19, or in the case of fuel cells 12 to 15, on the separator sheet 16.

In each of the gas chambers 22 of the fuel cells 11 to 15, a cathode 27 serving as the oxygen electrode is installed. This will comprise, for example, Raney silver in powder form, preferably bound together by means of a hydrophilic binder, e.g., a hydrophilic synthetic latex. Other catalytic materials, such as silver with activated carbon powder may also be used. The oxygen electrode 27 is pressed against the diaphragm 23 by a relatively fine meshed metal screen 28. Typically such a screen may be a nickel screen. The metal screen also serves as a current pickup and similar to the support frame in the electrolyte chamber is in contact with rib-like or corrugated waves 29 on a separator sheet 16, or, in the case of the fuel cell 15, on the contact sheet 19. Through this arrangement, the fuel cells 11 through 15 are electrically connected in series.

As illustrated, the asbestos diaphragm 23 in each of the fuel cells 11 to 15 has an outer zone of increased thickness, comprised of three layers designated 30, 31 and 32. More particulary, it comprises a middle layer 30 and outer layers 31 and 32. These layers are shown at a reduced scale in plan view on FIGS. 2 through 4. The middle layer or the central part 30 of the reinforced outer layer is a continuation of the central part 44 of the asbestos diaphragm, which separates the electrolyte chamber 21 and the gas chamber 22. On FIG. 3, the central part 44 is outlined by the broken line 45 and the dot-dash line 46. The area surrounded by the dotted line 45 corresponds approximately to the area of the anode 24 and the area encircled by the dot-dash line 46 approximately to the area of the cathode 27.

The outer layer 31 of the outer zone surrounds and defines the electrolyte chamber 21. As shown, this layer or this part of the outer zone has a smaller width than the outer layer 32 of the outer zone surrounding and forming the gas chamber 22 of the fuel cell. Furthermore, as is evident from FIGS. 1 and 3, the fuel electrode (anode) in the electrolyte chamber 21, has a larger area than the oxidant electrode (cathode) 27 in the gas chamber on the other side of the asbestos diaphragm. The support frame 25 in the electrolyte chamber 21 has an area essentially the same as that of the anode 24. Similarly, the metal screen 28 in gas chamber 22 will have essentially the same area as the cathode 27.

Figures 2, 3, 4:
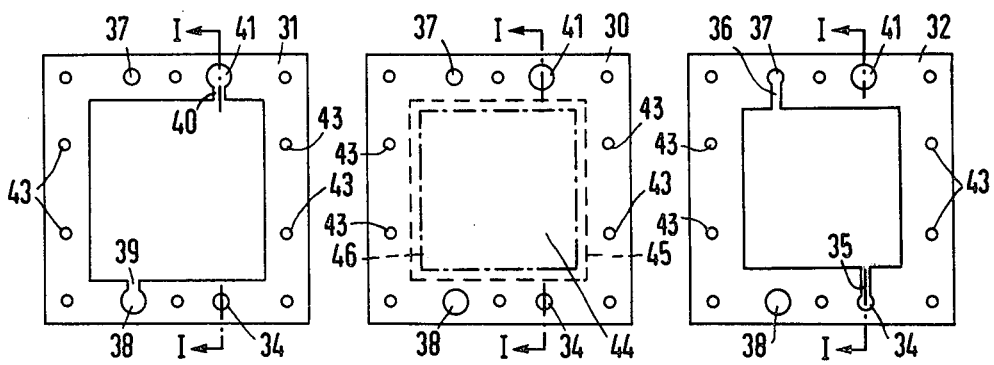
FIGS. 2 through 4 are plan views of the individual layers of the asbestos diaphragms used in the embodiment of FIG. 1.

As more clearly shown on FIGS. 2 through 4, the outer zones 30 through 32 of the asbestos diaphragms 23 along with the separator sheets 16 (see FIG. 1) and as required, the end plates 18 and contact sheets 19, are provided with holes which in the assembled battery form the lines extending through the battery stack for use in feeding and discharging the operating materials of the fuel cell battery.

Thus, oxygen is fed into the battery through a nozzle 33 into a line formed by holes 34 entering the gas chambers 22 of the individual fuel cells through ducts 35 provided in the layers 32 of the outer zone of the asbestos diaphragms 23. After flowing through the cells, the portion of the oxygen not used up enters into the upper region of the battery through further ducts 36 also provided in layers 32 of the outer zones into the line formed by the holes 37 from which it is discharged from the battery. The electrolyte/hydrazine mixture is fed into the lower region of the battery through a line formed by the holes 38, to each of the electrolyte chambers 21 of the fuel cell battery through ducts 39 provided in the layers 31 of the outer zones of the asbestos diaphragms 23. The spent mixture is removed in the upper region of the battery flowing from the electrolyte chambers 21 through ducts 40 also in layers 31 and leaving the battery through a line formed by holes 41 and a nozzle 42. The holes 43 shown on FIGS. 2 through 4 are used for the clamping bolts 17 illustrated on FIG. 1.

The middle part of the asbestos diaphragm 23 shown on FIG. 3 may comprise asbestos paper without a binder, prepared, for example, according to the method disclosed in French Pat. No. 1,556,744 using asbestos fibers pretreated with potassium hydroxide and annealed for hardening at temperatures of about 450°C. This middle portion may also contain synthetic binders as long as it does not lose its hydrophilic properties. Particularly well suited as a binder is butadiene styrene acrylnitrile copolymerisate. The nitrile groups are preferably saponified through the use of potassium hydroxide to form hydratizable carboxyl groups to ensure that the finished diaphragm is hydrophilic. The content of this binder may be 6 to 15% by weight, referred to the weight of the asbestos. Other binders such as, for example, chloroprene in amounts of 0.5 to 6% by weight, referred to the weight of the asbestos are also suitable. Methods for manufacturing these binder-containing asbestos diaphragms and other suitable binders are described in detail in French Pat. No. 1,546,172.

The two outer layers 31 and 32 of the outer zone of the asbestos diaphragm 23 shown on FIGS. 2 and 4, will comprise asbestos material filled with a relatively soft electrolyte resistant synthetic material. Particularly well suited for this purpose are polytetrafluorethylene and polyvinylchloride. The plastic content can be, for example, about 10% by weight, referred to the weight of the asbestos. Preparation can be accomplished by mixing asbestos fibers with plastic powders or emulsions and subsequently hot pressing or filtering off and drying.

For preparing the complete diaphragms having the outer zones of increased thickness, with parts of different widths, the following steps can be followed. First, the necessary ducts 35 and 36, along with ducts 39 and 40 are formed in the outer layers 31 and 32, respectively, which have been previously impregnated in a manner described above. This may be done, for example, by punching. At the same time, the required holes may also be punched. It should be noted however, that punching of holes which extend through all layers can also be done after the asbestos diaphragm has been completely assembled. The outer zone of the middle asbestos layer as defined by the dot-dash lines 46 of FIG. 3 is then impregnated with an electrolyte resistant synthetic multi-component resin, such as a commercially available epoxy resin. Care must be taken that no paths crossing the outer zone are left which could impair the tightness of the outer zone to gas and electrolyte. Impregnation may be carried out by immersion in the epoxy resin, by brushing-on the epoxy resin or through some other manner of application such as by silk screening. After the middle layer 30 of the outer zone is impregnated with epoxy resin, the layers 30, 31 and 32 are sandwiched together and the epoxy resin cured at elevated temperature. The resulting diaphragm will be one in which the layers 31 and 32 are cemented to the layer 30 in a electrolyte- and gas-tight manner by the epoxy resin.

The finished asbestos diaphragms 23 including their outer zone of increased thickness are then stacked along with the separator sheets 16 and contact sheets 19, with the electrodes 24 and 27 along with their associated support frames 25 and screens 28 placed in the electrolyte and gas chambers. The finished stack is then clamped between the end plates 18 using the bolts 17. In this process, the reinforced outer zones of the asbestos diaphragms 23 are pressed firmly against the separator sheets 16 and contact sheets 19 to completely seal the electrolyte and gas chambers of the fuel cell battery in a manner such that they are electrolyte- and gas-tight to the outside. It will be recognized that the fuel cell battery has a very simple design and furthermore can be easily disassembled for replacing parts, if necessary.

As noted above, the individual fuel cells 11 to 15 can be made very thin with the design of this nature. The spacing of the separator sheets 16 and contact sheets 19 from the center layers 30 of the asbestos diaphragms 23 can be, for example, 0.5 mm, with the middle layer 30 of the asbestos diaphragm and the separator sheets 16 and contact sheets 19 having a thickness of about 0.3 mm thick. In such a case, the thickness of the reinforced outer zones of the asbestos diaphragms will be approximately 1.3 mm. The central part of the asbestos diaphragms will preferably have volume porosities of between 20 and 50%. The hydrazine electrodes 24 designated as screen electrodes, and the support frames 25 are each about 190 mm × 190 mm and the oxygen electrodes 27 consisting of Raney silver each about 180 mm × 180 mm. The pressure in the electrolyte chamber is about 15 N/cm$^2$, and the pressure in the gas chamber about 20 N/cm$^2$.

Figure 10:
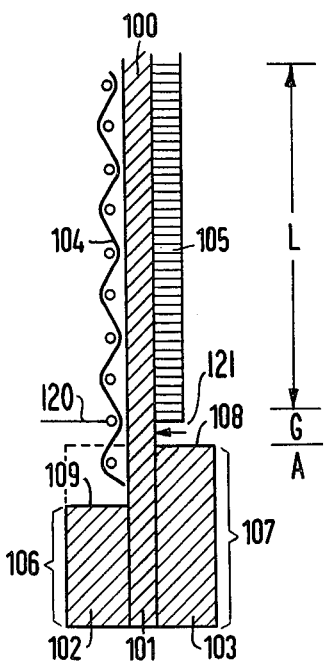
FIG. 10 is an enlarged cross sectional view of a portion of the fuel cell battery of FIG. 1 helpful in illustrating the manner in which the design of the present invention avoids the shear forces found in prior art batteries.

FIG. 10 illustrates an enlarged section of the fuel cell battery of FIG. 1. It illustrates in detail the different sizes of the electrodes and the different width of the outer zone on each side of the middle layer and is helpful in understanding how the present invention overcomes the problems of the prior art. As in FIG. 1, the asbestos diaphragm 100 has an outer zone of increased thickness consisting of three layers. The middle layer 101 is the continuation of the central part of the asbestos diaphragm and has on each side thereof, an outer layer designated 102 and 103, respectively. The width 106 of the layer 102, which seals the electrolyte chamber to the outside is smaller than the width 107 of the layer 103 sealing the gas chamber to the outside. However, the hydrazine electrode 104 on one side of the asbestos diaphragm 100 in the electrolyte chamber has a larger area than the oxygen electrode 105 on the other side of the diaphragm in the gas chamber, i.e., the electrode 104 and its associated support frame, extends beyond the inner edge 108 of the part 103 of the outer zone on the gas side. The inner edge of the part 102 of the reinforced outer zone of the asbestos diaphragm which defines the electrolyte chamber toward the outside, is designated 109. In this manner, the gap G between the edge 108 of the outer part 103 and the electrode 105 and to which a differential pressure can be applied, is supported with a counter-pressure on the opposite side by the extended electrode 104 and thus, the shear stresses present in the prior art do not occur. As indicated above, gaps in the order of 0.1 to 3 mm have been experienced in practice and preferably to account for this range of tolerances, the electrode 104 will be larger by 4 mm on each edge than the electrode 105, i.e., the distance between the line 120 and the bottom of electrode 104 will preferably be at least 4mm on each of the four sides.

Figure 5:
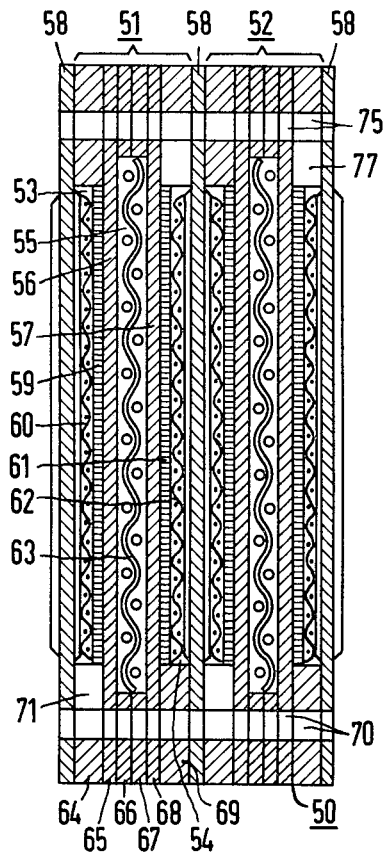
FIG. 5 is a schematic cross sectional view of a second embodiment of a fuel cell battery according to the present invention.

FIG. 5 illustrates two cells 51 and 52 of a fuel cell battery 50 and in which a gaseous fuel, such as hydrogen is reacted with a gaseous oxidant, such as oxygen. Each fuel cell includes a gas chamber 53 for the hydrogen, a gas chamber 54 for the oxygen and an electrolyte chamber 55, which may contain as an electrolyte, a potassium hydroxide, for example. In a manner similar to that described above, the hydrogen chamber 53 is separated from the electrolyte chamber by an asbestos diaphragm 56 and the oxygen chamber 54 separated from the electrolyte chamber 55 by an asbestos diaphragm 57. The two fuel cells 51 and 52 are separated from each other by a separator sheet 58. Similarly, other separator sheets 58 are shown separating the illustrated cells from other cells which are not shown. These will be nickel as with the separator sheets described in connection with FIG. 1. In the gas chamber 53 is an anode 59 serving as the hydrogen electrode and which may be, for example, Raney nickel powder optionally provided with a binder. It makes electrical contact through a fine-mesh nickel screen 60 and is pressed against the asbestos diaphragm 56. In the gas chamber 54, a cathode 61 serving as the oxygen electrode is placed and may consist, for example, of Raney silver powder optionally provided with a binder. It makes contact through a fine-mesh nickel screen 62 and is pressed against the asbestos diaphragm 57. In the electrolyte chamber 55, a support frame 63 in the form of a coarse-meshed screen, for example, of nickel or electrolyte-resistant plastic is provided as a spacer between the asbestos diaphragms 56 and 57. The hydrogen electrode 59 and the oxygen electrode 61 along with their associated screens are of approximately equal area. However, both these electrodes are smaller than the support frame 63 in the electrolyte chamber 55.

Figure 7:
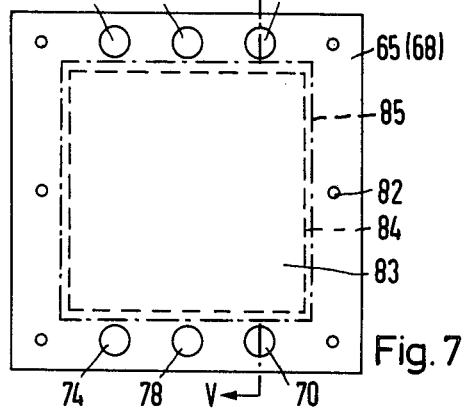

The reinforced outer zone of the asbestos diaphragm 56 includes layers 64, 65 and 66 and the reinforced outer zone of the asbestos diaphragm 57, the three layers 67, 68 and 69. The middle parts 65 and 68 of the asbestos diaphragms 56 and 57 are identical and are shown on a reduced scale in a plan view in FIG. 7. Here, the outer zone is indicated at the central part 83 of the asbestos diaphragm by the dotted line 84 or the dot-dash line 85. The area within the dotted line 84 corresponds to the area of the electrodes, i.e., anode 59 and cathode 61, and the area outlined by the dot-dash line 85 to the area of the support frame 63.

Figure 6:
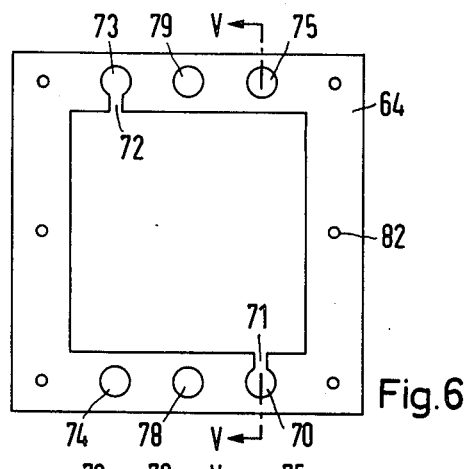
FIGS. 6 through 9 illustrate the different layers of the asbestos diaphragms used in the fuel cell battery of FIG. 5.
Figure 9:
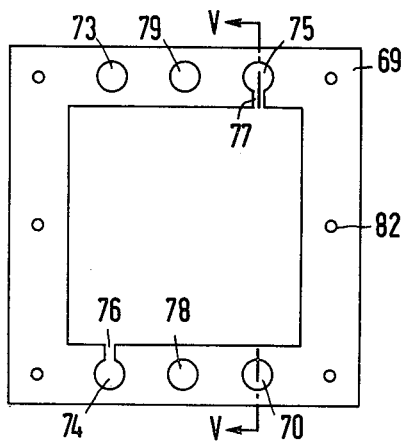
Figure 8:
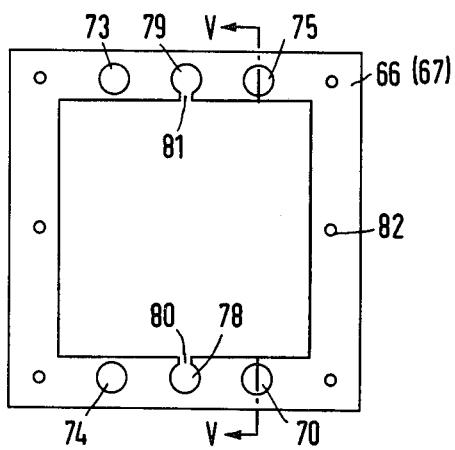

The outer layer 64 of the outer zone of the asbestos diaphragm 56, shown on FIG. 6, surrounds the hydrogen chamber 53 and the outer layer 69 of the outer zone of the asbestos diaphragm 57, shown on FIG. 9, surrounds the oxygen chamber 54. The outer layers 66 and 67 of the outer zones of the asbestos diaphragms 56 and 57, which jointly surround the electrolyte chamber 55, are identical and are shown on FIG. 8. The cross section shown on FIG. 5 is taken along the lines V—V in FIGS. 6 through 9.

In this arrangement, hydrogen is fed into the battery through the line formed by the holes 70 and through the ducts 71. Unreacted gas is discharged from the hydrogen chambers 53 of the fuel cell battery, through ducts 72 in the layers 64 in the upper region of the battery and through a line formed by the holes 73. Corresponding lines formed by the holes 74 and 75 respectively, along with ducts 76 and 77 provided in the layers 69 are used for the supply and discharge of oxygen. The discharge of oxygen takes place in the ducts 77 and the line formed by the holes 75. Lines formed by holes 78 and 79 and ducts 80 and 81 in the layers 66 and 67, are used to supply and discharge the electrolyte. The holes 82 are provided for bolts used to clamp the individual part of the fuel cell battery together between contact sheets and end plates in the manner described in connection with FIG. 1.

The asbestos diaphragms used in the fuel cell battery of FIG. 5 may be of the same construction of those described in connection with FIG. 1. The asbestos diaphragms 56 are cemented together from the layers 64, 65 and 66 and the asbestos diaphragms 57 from the layers 67, 68 and 69. In the finished fuel cell battery, reinforced outer zones of the asbestos diaphragms 56 and 57 are pressed against each other as well as against the separator sheets 58. As with the previous embodiment, at both compression points, an excellent seal is obtained.

It will be recognized by those skilled in the art that the fuel battery of the present invention can be modified in many ways. Instead of a square shape, a rectangular shape, polygonal or round shape may be used. Similarly, other electrodes such as sintered metal electrodes and other catalytic materials can be used. If sufficiently acid-resistant asbestos, such as blue asbestos, is used, the fuel cell battery of the present invention may also be used with acid electrolytes. Similarly, other fuels, such as methanol may be used. These and other modifications may be made, without departing from the spirit of the invention, which is intended to be limited solely by the appended claims.

What is claimed is:

1. In a fuel cell battery of the filter press type which uses a liquid electrolyte and at least one gaseous reactant comprising:
   a. a plurality of individual fuel cells each having:
      1. a gas chamber containing an electrode;
      2. an electrolyte chamber containing at least one of a support frame and a support frame and an electrode;
      3. an asbestos diaphragm separating said gas chamber and electrolyte chamber;
      4. separator sheets separating individual fuel cells from each other;
      5. each asbestos diaphragm having electrolyte impermeable gas-tight outer zones of increased thickness, which outer zones are compressed and contain supply ducts therein for supplying materials to the gas and electrolyte chambers, both said electrodes and support frames extending in all directions substantially to meet said impermeable gas-tight outer zones of increased thickness, the improvement comprising:
   b. the part of the outer zone of increased thickness on the electrolyte side of the asbestos diaphragm having a width smaller than the part of the outer zone of increased thickness on the gas side and at least one of a support frame and an electrode in the electrolyte chamber extending beyond the inner edge of the part of the outer zone of increased thickness of the gas side.

2. A fuel cell battery according to claim 1 wherein the at least one of the support frame and electrode in the electrolyte chamber extends beyond the inner edge of the part of the outer zone of increased thickness on the gas side by at least an amount corresponding to its distance from the surrounding part of the outer zone of increased thickness on the electrolyte side.

3. A fuel cell battery according to claim 2 wherein the at least one of the support frame and electrode in the electrolyte chamber extends on all sides at least 4 mm beyond the edge of the electrode arranged in the gas chamber.

4. A fuel cell battery according to claim 1 wherein the at least one of the support frames and the electrodes in the electrolyte chambers extend on all sides at least 4 mm beyond the edges of the electrodes arranged in the gas chambers.

5. A fuel cell battery according to claim 1 wherein each of said asbestos diaphragms comprises at the outer zone a central portion and on each side thereof parts bonded to the central portion.

6. A fuel cell battery according to claim 5 wherein said parts bonded to said central portion are bonded using a multi-component resin which also serves to make said outer zone of said central portion electrolyte impermeable and gas-tight.

7. A fuel cell battery according to claim 6 wherein said parts bonded to said central part are impregnated with a soft electrolyte impermeable and gas-tight material.

\* \* \* \* \*